United States Patent Office 2,782,228
Patented Feb. 19, 1957

2,782,228

PREPARATION OF ADDUCTS OF LIQUID, LINEAR POLYBUTADIENE AND ESTERS OF ITACONIC AND ACONITIC ACIDS

Joachim Dazzi, Dayton, Ohio, assignor to Monsanto Chemical Company, St. Louis, Mo., a corporation of Delaware No Drawing. Application May 21, 1953,
Serial No. 356,600

5 Claims. (Cl. 260—485)

This invention relates to high molecular weight adducts and more particularly provides linear polymeric compounds having a plurality of carboxylate radicals and a process for producing the same.

An object of the invention is the provision of new and useful polycarboxylates. Another object of the invention is the preparation of viscous polycarboxylates from readily available polymeric materials. Still another object of the invention is the preparation of viscous linear polycarboxylates from butadiene hydrocarbon polymers. A further object of the invention is to provide for the coatings, synthetic resins and plastics, plasticizer, rubber and textile industries a new class of viscous polymeric materials having a high content of carboxylate radicals.

These and other objects of the invention hereinafter disclosed are provided by the following invention wherein there are prepared viscous adducts of (1) a polymeric butadiene hydrocarbon with (2) an ester having the formula

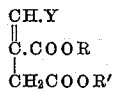

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals and Y is selected from the class consisting of hydrogen and the radical —COOR, from 1 to 2 moles of said ester being combined at each of at least 5 percent of the olefinic units of said polybutadiene.

Esters having the above formula and useful for the present purpose include itaconates and aconitates, e. g., the simple alkyl itaconates and aconitates such as methyl, ethyl, isopropyl, n-propyl, n-butyl, tert.-butyl, isoamyl, n-hexyl, n-heptyl or isooctyl itaconate or aconitate; the mixed alkyl itaconates and aconitates such as ethyl methyl itaconate, dimethyl n-octyl aconitate and butyl 2-ethylhexyl itaconate; the simple alkoxyalkyl itaconates and aconitates such as bis(2-methoxyethyl) itaconate, tris(3-ethoxy-n-propyl) aconitate and bis(4-butoxybutyl) itaconate; the mixed alkoxyalkyl esters such as 3-propoxypropyl 2-ethoxyethyl itaconate or bis(methoxymethyl) 2-amyloxyethyl aconitate and esters derived from both a fatty alcohol and a glycol monoether such as diethyl 2-ethoxyethyl aconitate or n-amyl 3-propoxy-2-propyl itaconate, the hydroxyalkyl esters such as bis(2-hydroxyethyl) itaconate or n-propyl bis(3-hydroxypropyl) aconitate; the alicyclic esters such as cyclopropyl itaconate, cyclopentyl aconitate, cyclohexyl itaconate and cyclopentyl dioctyl aconitate; the alkylmercaptoalkyl esters such as bis(4-ethylmercaptobutyl) itaconate; the aryl esters such as phenyl itaconate, β-naphthyl itaconate and 2-xenyl aconitate or ethyl phenyl itaconate and bis(2-ethoxyethyl) β-naphthyl aconitate; the aralkyl esters such as benzyl itaconate or aconitate; the furfuryl itaconate, tetrahydrofurfuryl aconitate, diphenyl furfuryl aconitate; etc.

Butadiene hydrocarbon polymers which add to the above itaconates or aconitates are solid or normally liquid polymers of butadiene hydrocarbons such as 1,3-butadiene, isoprene, piperylene, dimethylbutadiene, 2-methylpentadiene, 2-ethylhexadiene and the like. The presently useful polymers may also be polymers derived by copolymerization of two or more different butadiene hydrocarbons, e. g., from a mixture of butadiene and piperylene.

Reaction of the butadiene hydrocarbon polymers with the present itaconates or aconitates to form adducts takes place readily by heating the polymer with the ester in the presence or absence of an inert diluent or polymers solvent at ordinary or superatmospheric pressures. When operating at atmospheric pressure, temperatures of from, say, 150° C. to 300° C. and preferably of from 180° C. to 240° C. are used. When working with the readily polymerizable esters an inhibitor of polymerization may be incorporated into the reaction mixture. The number of carboalkoxy groups introduced into the polymer molecule depends upon the diene content of the polymer, upon the nature of the individual ester used, and upon the reaction conditions employed. Generally, operation within the higher temperature ranges, i. e., at temperatures of above, say, 180° C. and below the decomposition point of any of the reactants leads to introduction of more carboalkoxy groups than does operation at the lower temperatures. The degree of carboalkoxylation also depends upon the individual itaconate or aconitate employed. Usually the lower alkyl esters are more reactive than either the higher alkyl or the higher alkoxyalkyl esters. In view of the effect of the reaction conditions and nature of the individual itaconate or aconitate upon the extent of carboalkoxylation, it is recommended that for each initial run there be experimentally determined the operating conditions which should be observed for obtaining the desired degree of carboalkoxylation.

The quantity of itaconate or aconitate present in the adduct will also depend upon its availability in the reaction mixture. Obviously, for the formation of adducts in which at least one mole of the ester has added to each olefinic unit of the liquid polymer, the calculated amount of ester must be present in the reaction mixture.

The reaction may be effected in the presence or absence of an inert solvent or diluent. Particularly when working with the liquid polymers, no extraneous solvent or diluent need be employed. However, with the solid polymers and in some instances with the liquid polymers, it may be advantageous to work with a solution of the polymer in an inert, extraneous diluent or solvent, e. g., a liquid hydrocarbon or a liquid derivative thereof such as benzene, xylene, nitrobenzene or dichlorobenzene, a high-boiling aliphatic hydrocarbon such as kerosene, halogenated hydrocarbons such as chloroform or tetrachloroethane, etc. When operating at atmospheric pressure, such diluent is generally removed before reaction of the polymer with the ester occurs, due to the high temperatures used.

The contemplated use of the polybutadiene-itaconate or aconitate adducts will determine the extent of carboalkoxylation desired. Adducts having a low proportion of carboalkoxy radicals are advantageously employed as adhesives, particularly as adhesives in bonding of cellulosic materials. Adducts having a higher proportion of carboalkoxy groups, on the other hand, are useful as synthetic resin plasticizers.

That the polybutadiene-itaconate or aconitate reaction products are adducts rather than blends of the polybutadiene and polymeric esters may be evidenced by hydrolysis of the reaction products to completely water-soluble materials. Thus, upon heating the present reaction products with aqueous alkali metal hydroxides or ammonia, they may be entirely converted to water-soluble salts. Treatment of the salts with dilute mineral acids yields the free polycarboxylic acids. The present invention thus provides not only the ester adducts, but also a new series of polycarboxylic acids and their salts.

The present invention is further illustrated, but not limited, by the following examples:

*Example 1*

To a reaction vessel equipped with mechanical stirrer, thermometer and a Dean and Stark trap carrying a reflux condenser, there was added 601 g. (2.5 moles) of butyl itaconate and 54 g. (1 mole) of a liquid polybutadiene, a red-orange viscous material having a molecular weight of approximately 1500, analyzing 89.2% C, 11.19% H and having a viscosity of 880 Centipoises at 50° C. as determined by the Brookfield method at a spindle rate of 1 R. P. M. The contents were stirred for 8 hours at 200° C. to 220° C. (mostly 210° C.) in a nitrogen atmosphere. The reaction mixture was then distilled at 192° C./1 mm. using an oil-bath temperature of 205° C. to give a total of 238.1 g. of unreacted butyl itaconate. There was thus obtained as residue 412 g. of the liquid polybutadiene-butyl itaconate adduct $n_D^{25}$ 1.4729, analyzing 67.79% C, 9.17% H and (by difference) 23.04% O. Recovery of a total of 238.1 g. of itaconate, plus the 412 g. of residue shows a material recovery of 99.5 percent. The composition of the residue thus corresponds to an adduct in which 54 g. of the polybutadiene is combined with 412 minus 54 or 358 g. of butyl itaconate. Based on the molecular weight of a butene unit as 54 and that of butyl itaconate as 242.0, in the present adduct one butene unit has combined with 358/242 or 1.48 moles of butyl itaconate, i. e., the residue represents an adduct in which an average of 1.48 moles of butyl itaconate has combined with each olefinic unit of the original polymer. An adduct of this conten has calculated values of 67.55% C and 9.37% H. These agree well with the experimentally determined values shown above.

*Example 2*

Employing the reaction equipment described in Example 1, a mixture of 108 g. (2 moles) of the liquid polybutadiene of that example and 1290.5 g. (5 moles) of ethyl aconitate, having $n_D^{25}$ 1.4530, was maintained at 210–225° C. for 6 hours. At the end of this time, the reaction mixture had $n_D^{25}$ 1.4618. Distillation of the resulting reaction mixture removed 1000 g. of a material, $n_D^{25}$ 1.4520, boiling below 180° C./1–2 mm., mostly ethyl aconitate. There was thus obtained as residue 346 g. of a very dark, resinous adduct, $n_D^{25}$ 1.4800, analyzing 66.04% C and 8.16% H and (by difference) 25.80% O. There was realized a material recovery of 98.0 percent. Hence the residue contains 346 minus 108 or 238 g. (0.92 mole) of ethyl aconitate per 108 g. (2 butene units), and is thus an adduct in which an average of 0.46 mole of the aconitate is combined with each butene unit of the liquid polymer. The calculated carbon and hydrogen contents of an adduct in which an average of 0.46 mole of ethyl aconitate is combined with each butene unit of the polymer are 66.4% C and 8.25% H. These values agree very well with the observed values shown above.

*Example 3*

Hydrolysis of the liquid polybutadiene-butyl itaconate adduct of Example 1 was accomplished by refluxing, for 6 hours, 16.4 g. of the adduct in 206 g. of a 0.5 N ethanol-water (1:1) solution of sodium hydroxide, and then removing the alcohol-water mixture by distillation at reduced pressure. The incompletely dried residue (20.2 g.), was found to be completely water-soluble, yielding a clear, easily foaming solution when shaken with cold water. Hydrolysis of the liquid polybutadiene-butyl itaconate reaction product as here shown to give the completely water-soluble sodium salt, shows that addition, rather than polymerization, had occurred in the reaction of Example 1.

What I claim is:

1. The process which comprises heating a linear liquid polymeric butadiene hydrocarbon with an ester having the formula

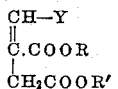

in which R and R' are alkyl radicals of from 1 to 8 carbon atoms and Y is selected from the class consisting of hydrogen and the radical —COOR, and recovering from the resulting reaction product an adduct in which from 1 to 2 moles of said ester are combined at each of at least 5 percent of the olefinic units of said polymeric hydrocarbon.

2. The process which comprises heating a linear liquid polybutadiene with an alkyl itaconate in which the alkyl radical has from 1 to 8 carbon atoms and recovering from the resulting reaction product an adduct in which from 1 to 2 moles of said itaconate is combined at each of at least 5 percent of the butene units of said polybutadiene.

3. The process which comprises heating a linear liquid polybutadiene with a trialkyl aconitate in which the alkyl radical has from 1 to 8 carbon atoms and recovering from the resulting reaction product an adduct in which from 1 to 2 moles of said aconitate is combined at each of at least 5 percent of the butene units of said polybutadiene.

4. The process which comprises heating a linear liquid polybutadiene with butyl itaconate and recovering from the resulting reaction product a viscous adduct in which from 1 to 2 moles of said itaconate is combined at each of at least 5 percent of the butene units of said liquid polybutadiene.

5. The process which comprises heating a linear liquid polybutadiene with ethyl aconitate and recovering from the resulting reaction product a viscous adduct in which from 1 to 2 moles of said aconitate is combined at each of at least 5 percent of the butene units of said liquid polybutadiene.

References Cited in the file of this patent

UNITED STATES PATENTS

| | | |
|---|---|---|
| 2,383,055 | Fryling | Aug. 21, 1945 |
| 2,468,769 | Morris | May 3, 1949 |
| 2,529,322 | Zimmer | Nov. 7, 1950 |

OTHER REFERENCES

Birch et al.: Ind. Eng. Chem. 24 (1932), pp. 40–50.